Oct. 27, 1959 C. R. SHEETS ET AL 2,909,890
TAPING APPARATUS
Filed March 23, 1956 4 Sheets-Sheet 1

INVENTORS
CHESTER R. SHEETS
JOHN SASSO
BY James G. Bethell
ATTORNEY

Oct. 27, 1959  C. R. SHEETS ET AL  2,909,890
TAPING APPARATUS

Filed March 23, 1956  4 Sheets-Sheet 2

INVENTORS
CHESTER R. SHEETS
JOHN SASSO
BY
James G. Bechtel
ATTORNEY

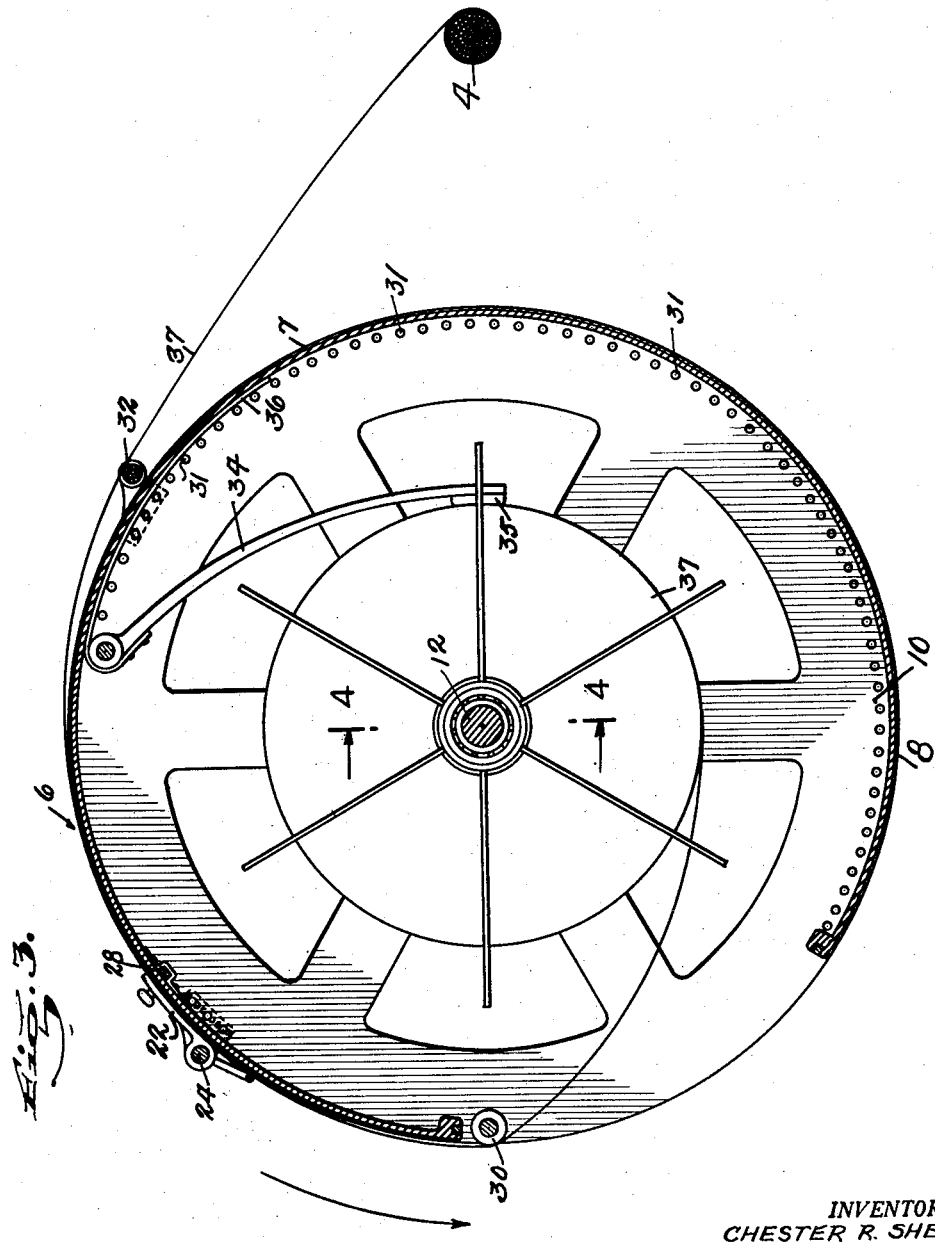

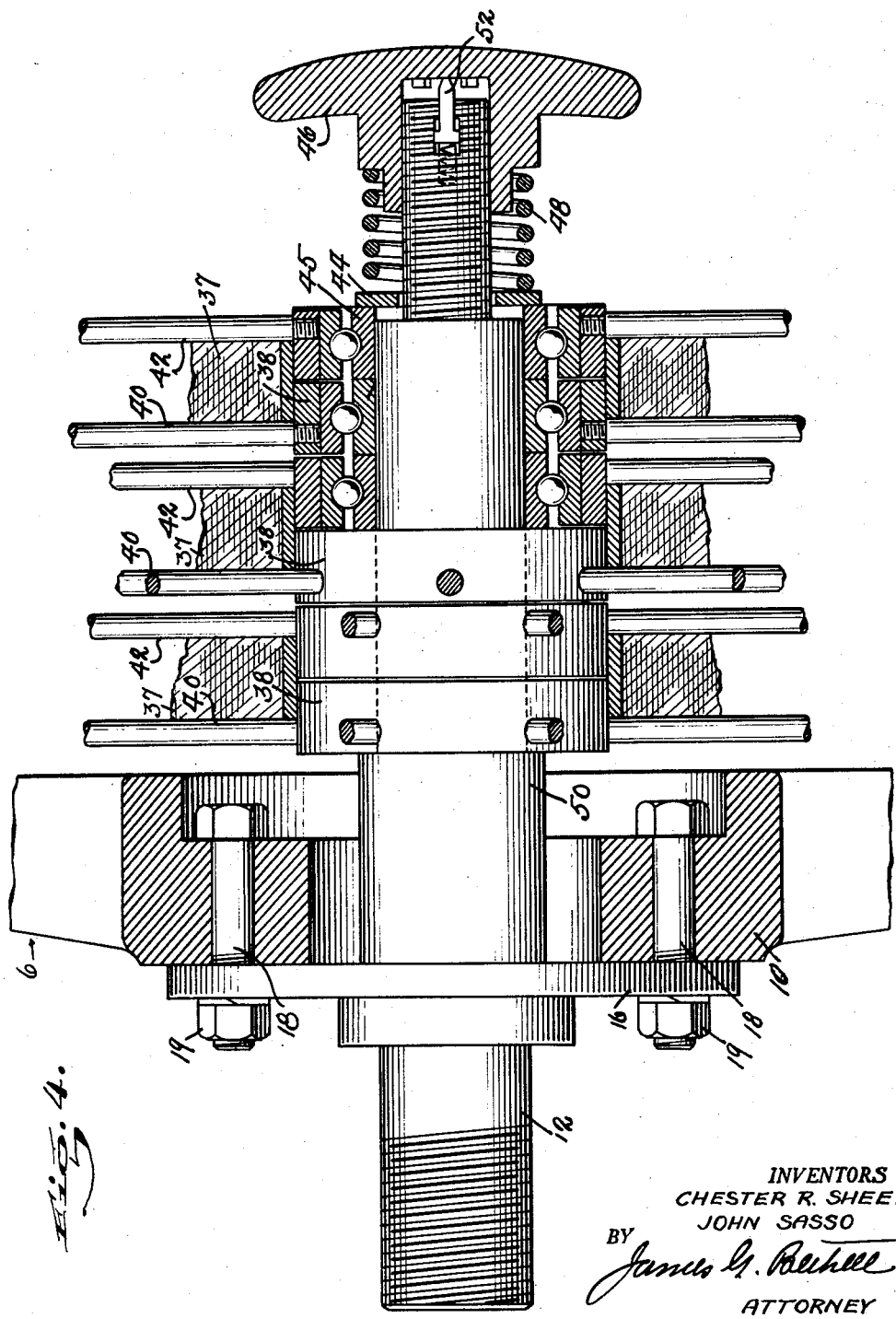

United States Patent Office 2,909,890
Patented Oct. 27, 1959

2,909,890

TAPING APPARATUS

Chester R. Sheets and John Sasso, East Paterson, N.J., assignors to The Okonite Company, Passaic, N.J., a corporation of New Jersey Application March 23, 1956, Serial No. 573,412

7 Claims. (Cl. 57—15)

Our invention relates to an improvement in taping apparatus primarily intended for applying insulating tape to a conductor in the manufacture of electric cables.

In general, the conventional method of applying insulating tapes to a cable conductor in the manufacture of electric cables involves rotating a gang of taping heads about the axis of a continuously advancing conductor.

One of the objects of our invention is to provide apparatus of this general type which possesses decided advantages over prior structures. For example, our construction provides novel means for tensioning and for guiding the tapes to ensure uniform tape tension and accurately controlled overlay of the tapes. Not only does our construction embody these features, but it permits the tension on the tapes of one taping head to be very accurately adjusted with respect to the tension on the tapes of other taping heads operating on the same cable, and it permits of adjusting the tapes of any one head so that they are all uniform.

Another important advantage of our improved construction resides in the fact that the drums of any head may be reloaded without upsetting or in any way disturbing the tension settings. In this connection it is to be noted that in our construction each drum of a taping head carries several reels of tape, and these reels are mounted on spools carried by the drums. The number of spools with which each drum is provided may vary; we have shown each drum carrying three spools. Each of these spools is split transversely for a purpose to be referred to later on herein, and, in replenishing the tape, it becomes necessary to remove some or all of the spools. The spools are locked in place on the drums by very simple mechanism, requiring no special skill nor manipulation for its operation, and any variation in the setting of the spool locking mechanism will effect no change in tape tension. In other words, after the tape tensions have been set up, the heads may be operated indefinitely, reloaded from time to time as a reel of tape becomes exhausted, without the necessity of making any alterations in or adjustment to the tape tensions.

Each drum in our improved construction is provided with a plurality of tape-snubbing fingers, these fingers being adjustably mounted on the drum periphery, each finger pressing a tape against the drum. Cooperating with these fingers is a tape-guiding spindle. These spindles are on the drum periphery and are adjustable circumferentially of the drum. As the tapes are drawn off the tape reels, they pass between the snubbing fingers and the drum periphery and then along and in contact with the drum surface to the guiding spindle. Inasmuch as the pressure of the snubbing fingers may be adjusted to vary the snubbing effect of these fingers, and inasmuch as the guiding spindle is adjustable to vary the length of tape which bears against the drum between the fingers and the spindle, it is quite evident that the tape tension may be initially set with great accuracy and will remain constant thereafter.

Other and further objects of our invention will be brought out later in this description.

In the accompanying drawings, wherein we have illustrated an embodiment of our invention, Fig. 1 is a perspective view of our improved apparatus;

Fig. 3 is an end elevation in part section of the drum of Fig. 2;

Fig. 4 is a section through Fig. 3 taken substantially on the line 4—4 of Fig. 3;

Figure 1:
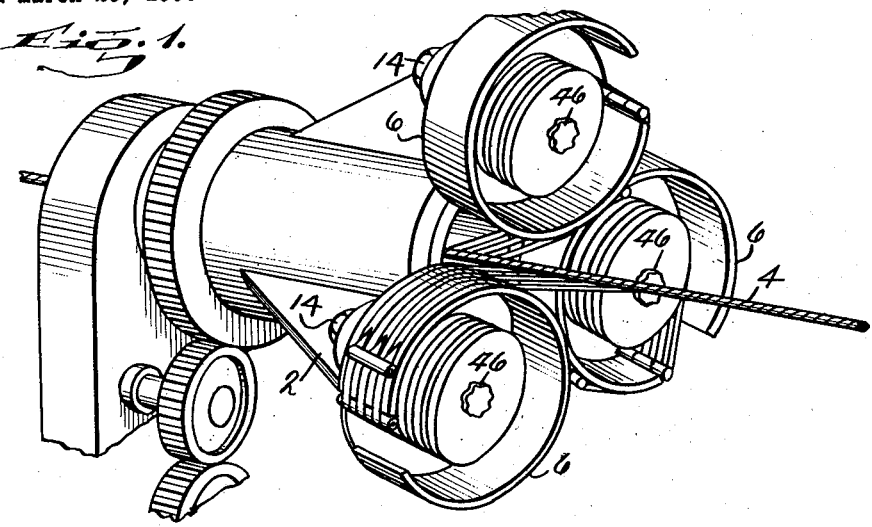
Figure 5:
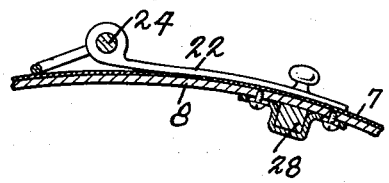
Fig. 5 is a fragmentary, part-sectional view illustrating the adjusting means for varying the pressure of the tape-snubbing fingers.
Figure 6:
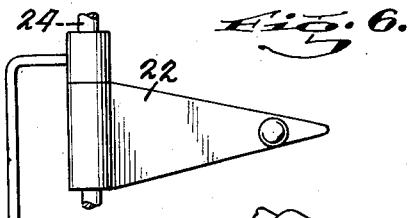
Fig. 6 is a plan view of the snubbing fingers of Fig. 5.
Figure 7:
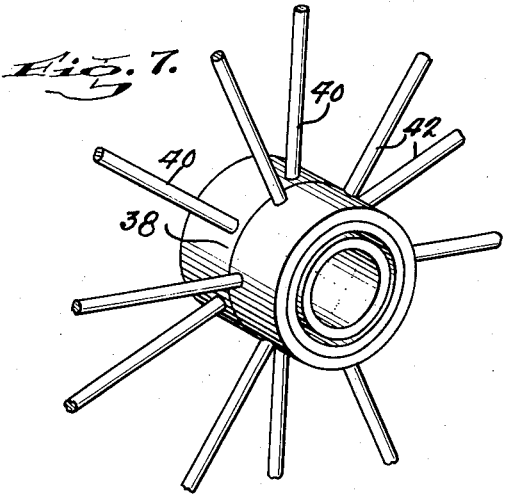
Fig. 7 is a view in perspective of one of the spools which carry the tape reels.
Figure 8:
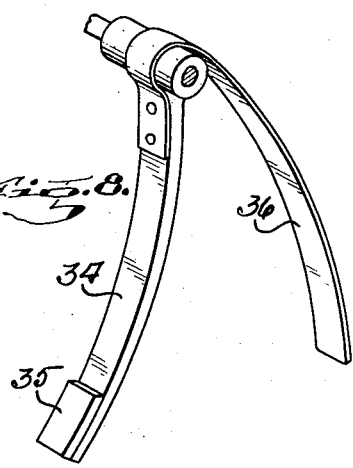
Fig. 8 is a perspective view of one of the braking fingers which we employ to engage the tapes at the periphery of the tape reels.

Referring to the drawings in detail, it will be seen that our improved taping head comprises a driven, rotatable spider 2. 4 designates the cable conductor to be taped, the conductor being drawn forward continuously through the center of the spider 2 during the taping operation.

6 designates our new and novel taping drums. These drums are mounted on the spider 2, so that, as the spider rotates, the drums will be carried in a circular path about the conductor 4. Each drum carries one or more reels of tape, depending upon the type of cable being taped at the moment; in our drawings we have shown three drums, spaced 120° apart, and each capable of carrying three reels of tape. Each drum, as will be seen from Figs. 2 and 3, for example, is a shell-like casting, comprising a side or peripheral wall 8 and a rear wall 10. While our invention is not limited to the use of any specific metal so far as the drums 6 are concerned, we prefer to employ magnesium, for example, for their construction. To provide a glass-smooth drum surface, so as to avoid chafing of the tapes, we equip each drum with a renewable shoe 7 of stainless steel, for example.

Passing through the center of the rear wall 10 of each drum is a drum-mounting shaft 12, the rear end of which is threaded and passes through the spider 2, where it receives nut 14. This not only provides for securing the shaft and, hence, the drum to the spider but permits the drum to be angularly adjustable for tensioning purposes, as will be brought out later. The shaft 12, forward of the threaded area, is flanged, as illustrated at 16, so that bolts 18 and 19 may be employed rigidly to secure the rear wall of each drum to the shaft.

Figure 2:
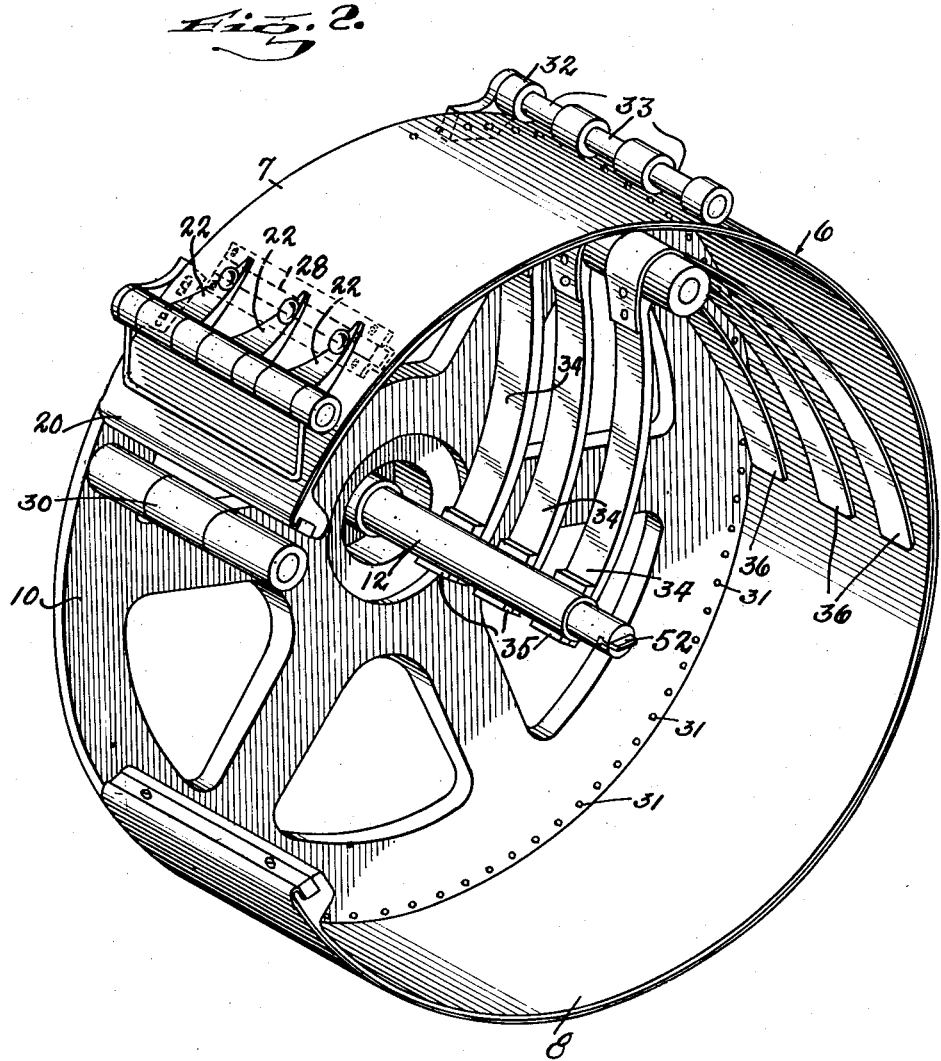
Fig. 2 is a view in perspective of one of the drums of the taping head of Fig. 1.

The peripheral wall 8 of each drum is discontinuous, as illustrated in Fig. 2.

Mounted on the rear wall 10 of each drum 6 and overlying the peripheral drum wall 8 near the trailing end 20 of the peripheral wall is a plurality of tape-snubbing fingers 22, mounted upon a pintle 24, as illustrated in Figs. 2 and 3, for example. The fingers are tapered lengthwise and are adjustable circumferentially of the drum. On the inner face of the peripheral wall of the drum, directly beneath the fingers 22, we mount magnets 28, one for each finger. These magnets may be adjustable circumferentially of the drum. The adjustability of the snubbing arrangement provides for attaining the desired tape-snubbing action with the maximum of ease.

Mounted on the inner face of the rear wall 10 of each taping drum in the gap between the two ends of the discontinuous peripheral wall 8 of the drum is a set of guide rollers 30.

Also mounted on the rear wall 10 of each drum 6 is an overlay guide spindle 32. This spindle, which is provided with a circumferential groove 33 for each tape, overhangs the drum wall 8, and its function is to guide the tapes to the conductor 4 with the proper overlay. These guide spindles are bolted to the rear wall of the drums 6 and are adjustable circumferentially of the drums, a series of bolt holes 31 being provided in each drum wall 10 for this purpose.

In addition to the foregoing, the rear wall 10 of each drum carries a plurality of arms 34, spring-loaded by springs 36. Each arm is provided with a shoe 35, and there is an arm for each reel of tape 37.

Referring now more particularly to Fig. 4 of the drawings, it will be seen that each drum shaft 12 carries a plurality of spools 38 for the reception of the tape reels 37. These spools are ball-bearing-mounted, and each is split transversely midway of its length. The spools are independently rotatable. Each half of each spool 38 is provided on its exterior with radially extending spokes 40 and 42. The spools are held upon the shaft 12 by a clamping plate 44, which slips over the outer end of the shaft and is adapted to bear against the inner member 45 of the outermost bearing for the spools. A hand nut 46 is screwed upon the outer end of shaft 12 against compression spring 48. By setting up the hand nut 46, it will be quite apparent that the inner races 45 of the spool bearings will be clamped between the plate 44 and the enlarged portion 50 of the shaft 12, so that, while the spools are freely rotatable on the shaft 12, they are held against endwise movement.

The outer end of the shaft 12 is provided with a spring-loaded locking lug 52, which is adapted to engage a depression, for example, in the inner face of the bore of the aforementioned nut 46. This provides a convenient means for locking the nut 46 against accidental turning on the shaft 12, and in setting up the machine for a run, the nut 46 is simply tightened until the pin or lug 52 engages the nut, so that no special skill is required so far as tightening the nut is concerned.

In setting up the machine for a run, the spring-loaded arms 34 are held away from the spools 38 by any convenient means and spools 38 removed from shaft 12. A reel 37 of tape is then threaded upon each spool between the spokes 40 and 42. As each spool is loaded, it is slipped back again upon the shaft 12 and, with the spools in place, the hand nut 46 is applied to the shaft. The braking arms 34 are then released to permit the shoes to bear against the periphery of each reel of tape. The ends of the tapes are then passed about the rollers 30, from thence between the snubbing fingers 22 and peripheral drum shoe 7, then along the face of this shoe and over the overlay guide spindle 32 to the cable conductor 4, where they are attached to the conductor. The snubbing fingers 22 and the overlay guide spindles 32 may then be adjusted circumferentially of each drum for the desired tape tension, the greater the tension desired, the greater the distance between the snubbing fingers and the overlay guide spindles to increase the length of drum shoe surface actually contacted by the tapes in passing from the snubbing fingers to the overlay guide spindles. By loosening the nuts 14, the shafts 12 and, hence, the drums 6 may be rotated slightly in the spider 2, to lead the tapes properly to the conductor 4. The spider is then rotated to carry the drums 6 in a curved path about the advancing conductor, to withdraw the tapes and wrap them helically about the conductor with the proper overlay.

It will be appreciated, of course, that in commercial operation, the taping heads will be operated in series along the length of the conductor, and that the adjustability of the tape tensions provided by our construction not only enables the tape tensions at each head to be accurately set, but enables the tension of the tapes at one head to be adjusted relatively to that of the tapes at another head.

It will be appreciated furthermore that, after the tape tensions have been properly adjusted in the original setting up of the machine, these tensions will remain unchanged until each reel of tape is exhausted, and that the drums may be reloaded without disrupting the tape tensions and without further tension adjustment.

It is to be understood that changes may be made in the details of construction and arrangement of parts hereinabove described within the purview of our invention.

What we claim is:

1. In apparatus for applying insulating tapes helically and with an overlap to a continuously advancing conductor, the combination of a taping drum; means for supporting a plurality of tape reels within said drum means for moving the drum and reels in a circular orbit about an advancing conductor, to draw tapes from the reels along and in contact with a portion of the face of the drum periphery and wrap them helically about the advancing conductor; tape-guiding means carried on the drum periphery and adjustable circumferentially thereof for guiding the tapes with the proper overlay to the conductor; and tape-snubbing means carried by the drum and overlying the said face of the peripheral wall of the drum for snubbing the tapes as they move along the said peripheral wall of the drum to the said tape-guiding means and the conductor.

2. In apparatus for applying insulating tape helically to a continuously advancing conductor, the combination of a taping drum; means for supporting a plurality of tape reels within said drum; means for moving the drum and reels in a circular orbit about an advancing conductor, to draw tapes from the reels along and in contact with a portion of the face of the drum periphery and wrap them helically about the advancing conductor; tape-guiding means carried on the drum periphery and adjustable circumferentially thereof for guiding the tapes with the proper overlay to the conductor; tape-snubbing means carried by the drum and overlying the said face of the peripheral wall of the drum for snubbing the tapes as they move along the said peripheral wall of the drum to the said tape-guiding means and the conductor; and means for adjusting the snubbing effect of said tape-snubbing means.

3. In apparatus for applying insulating tape helically to a continuously advancing conductor, the combination of a taping drum; means for supporting a plurality of tape reels within said drum; means for moving the drum and reels in a circular orbit about an advancing conductors to draw tapes from the reels along and in contact with a portion of the face of the drum periphery and wrap them helically about the advancing conductor; tape-guiding means carried on the drum periphery for guiding the tapes with the proper overlay to the conductor; tape-snubbing means carried by the drum and overlying the said face of the peripheral wall of the drum for snubbing the tapes as they are drawn along the said peripheral wall of the drum to the said tape-guiding means and the conductor; and means for varying the setting of said tape-guiding means and said tape-snubbing means to vary the the tension on said tapes.

4. In apparatus for applying insulating tape helically to a continuously advancing conductor, the combination of a taping drum; a mounting shaft for said drum axially disposed with respect to the drum; tape spools rotatably mounted on said shaft within said drum; means for moving the drum and tape spools in a circular orbit about the conductor, to draw tapes from the spools along the face of the drum periphery and wrap them helically about the conductor; tape-guiding means mounted on the periphery of said drum to guide the tapes with the proper overlay to the conductor; pivoted tape-snubbing fingers overlying and cooperating with said face of the peripheral wall of the drum, to snub the tapes while they are passing to the conductor; and a magnet for each finger, said magnets being mounted on the inner face of said peripheral wall beneath said fingers for pivoting the fingers toward the drum peripheral wall, said fingers being tapered lengthwise and adjustable circumferentially of the drum peripheral face, thereby to vary the snubbing action of the fingers upon the tape.

5. In apparatus for applying insulating tape helically to a continuously advancing conductor, the combination of a taping drum comprising a rear wall and a peripheral wall; a mounting shaft for said drum passing through said rear wall in the axis of the drum to the drum interior; means for driving the drum in a circular orbit about an advancing conductor; tape-mounting spools lying within said drum and rotatably mounted on said shaft, each of said spools being divided transversely into two sections, and said spools being separately removable; radially extending spokes carried by each section of each spool for retaining a reel of tape upon the spool; and quick-release means for retaining the spools in place on said shaft.

6. In apparatus for applying insulating tape helically to a continuously advancing conductor, the combination of a taping drum comprising a rear wall and a peripheral wall; a mounting shaft for said drum passing through said rear wall in the axis of the drum to the interior of the drum; means for driving said drum in a circular orbit about an advancing conductor; tape-mounting spools lying within said drum and rotatably mounted on ball bearings on said shaft, each of said spools being divided transversely into two sections, and the spools being separately removable from the shaft; radially extending spokes carried by each spool section for retaining a reel of tape upon each spool; and quick-release means for retaining the spools in place on said shaft, said quick-release means comprising a nut screwed upon the end of the shaft, together with locking means for the nut to prevent accidental displacement of the nut on the shaft.

7. In apparatus for applying insulating tape helically to a continuously advancing conductor, the combination of a taping drum; a rotatably driven spider; a shaft rotatably adjustable in said spider, said shaft carrying said drum and being axially disposed with respect thereto; tape-mounting spools rotatably mounted on said shaft within said drum; means for moving the drum in a circular orbit about a conductor, to draw tapes from the spools and wrap them helically and with an overlap about the conductor; tape-guiding means mounted on the periphery of said drum to guide the tapes, as they are drawn from the reels across the face of the peripheral wall of the drum, to the conductor with an overlay; fingers overlying and cooperating with the face of the peripheral wall of the drum, to snub the tapes as they are drawn from said reels and pass to the tape-guiding means and to the conductor; spring-loaded arms mounted within the drum and adapted to bear upon the periphery of each reel of tape throughout the unwinding of the tapes from the reels; and means for adjusting said tape-guiding means and said fingers circumferentially of the drum to vary the tape tension.

References Cited in the file of this patent

UNITED STATES PATENTS

| | | |
|---|---|---|
| 303,924 | Duplain | Aug. 19, 1884 |
| 408,696 | Clorer | Aug. 13, 1889 |
| 784,030 | Bubolz | Mar. 7, 1905 |
| 1,208,399 | Subers | Dec. 12, 1916 |
| 1,340,516 | Andren | May 18, 1920 |
| 2,570,929 | Fitch et al. | Oct. 9, 1951 |
| 2,782,138 | Olson et al. | Feb. 19, 1957 |

FOREIGN PATENTS

| | | |
|---|---|---|
| 507,055 | Great Britain | June 8, 1939 |
| 893,523 | France | July 30, 1944 |
| 641,882 | Germany | Apr. 14, 1931 |
| 641,883 | Germany | Apr. 22, 1931 |
| 662,806 | Germany | May 26, 1934 |